Patented Dec. 2, 1941

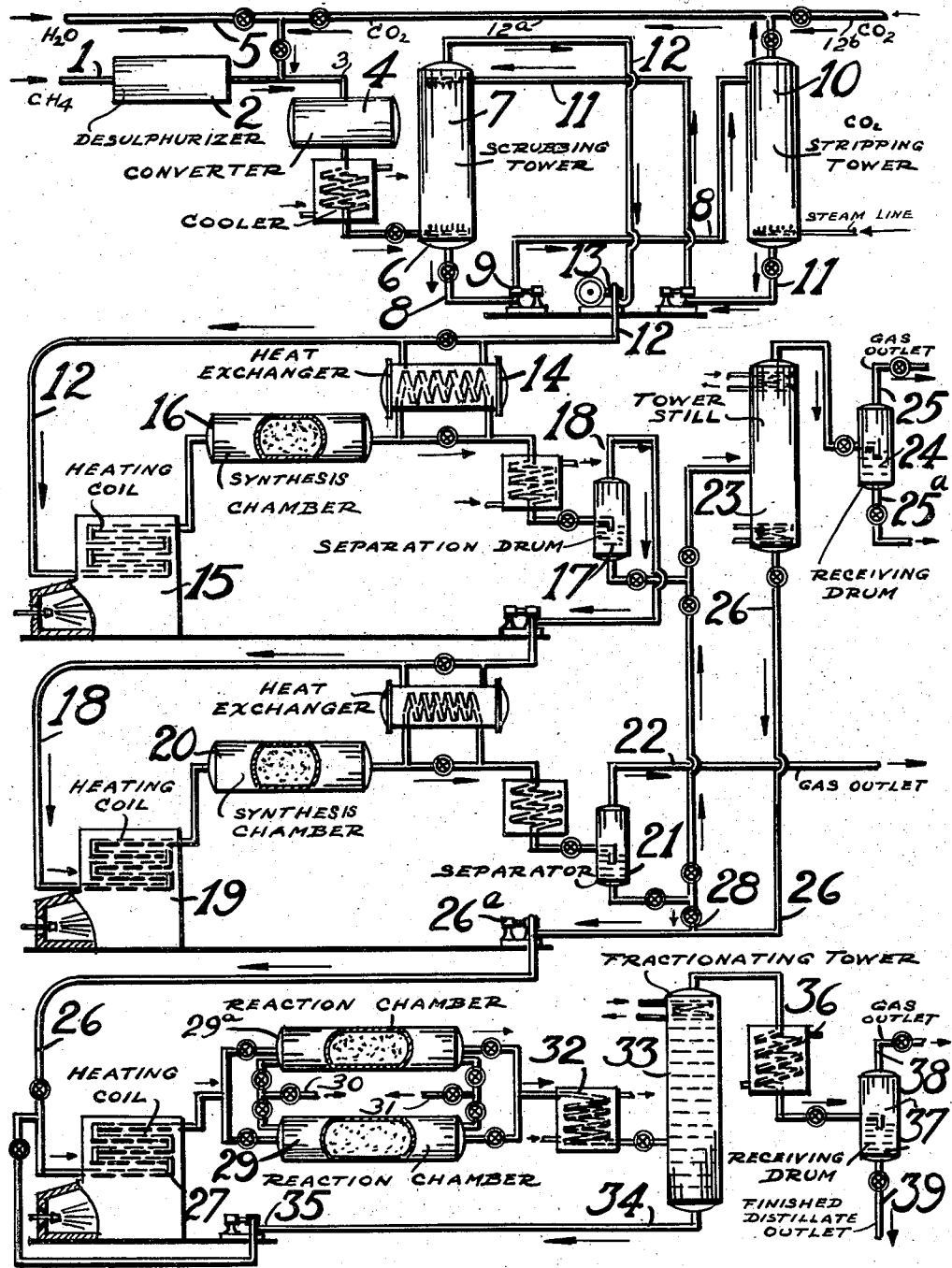

2,264,427

UNITED STATES PATENT OFFICE 2,264,427

LIQUID PROCESS FOR MANUFACTURE OF MOTOR FUEL

Willard C. Asbury, London, England, assignor to Standard Catalytic Company, a corporation of Delaware Application May 20, 1938, Serial No. 208,989

5 Claims. (Cl. 196—50)

The present invention relates to the art of producing valuable hydrocarbon fuels from less valuable carbonaceous materials, and more specifically to the improved method for synthetically producing fuels for internal combustion engines. The invention will be fully understood from the following description and the drawing.

The drawing is a semi-diagrammatic and sectional elevation of an apparatus adapted for carrying out the present process and indicates the flow of materials therethrough.

One object of the present process is to produce a high grade motor fuel or gasoline from waste carbonaceus materials. While some such processes are now known in the art, it is also known that the products obtained therefrom are poorly suited for the present day engines, first because of the unstable character of the fuel, but mainly because of their extremely poor antidetonation characteristics. It is found that the application of the present process corrects to a large degree the faults of prior processes as will be understood from the following description.

Turning to the drawing, the numeral 1, designates a pipe through which waste hydrocarbon gas is supplied. This may be a natural gas, a petroleum gas, cracked gas, coal gas or the like. It is first subjected to desulphurisation indicated generally at 2. The particular process employed should be adapted to the particular raw material, and the choice may be made between many known processes by which organic sulphide and hydrogen sulphide are removed. The gas may be passed over ferrous sulphide, for example, and then a scrubbing liquid capable of absorbing hydrogen sulphide. The purified gas then passes by a pipe 3 to a converter 4, wherein hydrocarbon gas is caused to react with steam which is supplied by a pipe 5. The reaction is carried out at a temperature above about 1200° F. and is promoted by catalysts containing nickel or cobalt. Excellent catalysts may be made by absorbing nickel or cobalt salts such as the nitrates in magnesia, alumina or bauxite, and then reducing the salt to the metal by heat. The conversion process results in the decomposition of the hydrocarbon and produces a mixture of hydrogen, carbon monoxide and carbon dioxide, the proportion of the latter being decreased by raising temperature and reducing the amount of excess steam.

The conversion gas is now treated to separate the $CO_2$ and for this purpose any known process may be employed, for example, the gas may be cooled and scrubbed with liquid materials capable of dissolving carbon dioxide from the gas mixture. As scrubbing agents sodium carbonate, triethylolamine, amino-propanol and the like may serve as examples. As illustrated in the drawing the gas passes through the tower 6, and is scrubbed therein by the absorption liquid which enters by means of pipe 7, and passing through the tower absorbs the carbon dioxide and leaves from the bottom of the tower 6, by a pipe 8. Pump 9 passes the liquid to a stripping tower 10, which may be supplied with heat indirectly or may be heated by the direct addition of steam so as to remove the absorbed carbon dioxide and to regenerate the scrubbing liquid which is returned to the tower 7 by the pipe 11.

Carbon dioxide thus recovered may be advantageously collected in a pipe 12a and passed along with such additional quantities thereof (by pipe 12b) as may be required to pipe 3, so as to enter the converter 4 along with the hydrocarbon gas and steam. The object of this addition to the gas undergoing conversion is to produce a more favorable ratio of carbon monoxide to hydrogen, than is obtained by the use of the hydrocarbon gas and steam alone. When steam alone is employed with gases consisting principally of methane the ratio of carbon monoxide to hydrogen produced by reaction approximates 1 to 4 and it is preferred to add a sufficient amount of carbon dioxide to change this ratio to about 1 to 2.

The synthesis gas is now removed from the scrubbing tower 6 by pipe 12 and is compressed in a pump 13 for use in the subsequent step. It will be realized that the method described above is particularly adapted for use with hydrocarbon gas but, if hydrocarbon gas is not available, other carbonaceous material may be employed, for example, coal or coke may be converted with steam or a mixture of steam with carbon dioxide to produce the desired mixture of carbon monoxide and hydrogen using the equipment employed in water gas production. It is important to adjust the ratio of gases, so as to approximate one part of carbon monoxide to two of hydrogen however, and when both coal and hydrocarbon gases are available this may be conveniently done by separately converting each with steam alone and then admixing the converted gas in the proper proportions.

Whatever the process, by which synthesis gases are produced, they are now compressed, as indicated above, to a pressure suitable above atmospheric and are heated, as for example, in the heat exchanger 14 and heater 15 before being passed into a converter 16, which is adapted to withstand pressure imposed at temperatures up to about say 675° F. The working temperature of the converter ordinarily falls within the range of from 300° to 650° F., and pressures from atmospheric to 50 atmospheres are employed. Catalytic agents are supplied in this converter and these consist essentially of metals and of metal compounds of the eighth group of the periodic system, such as, nickel, cobalt, but principally iron, especially such materials admixed with alkali, such as caustic soda or potash.

The reaction gases obtained from the reactor 16 are cooled so as to permit condensation of liquefiable materials produced in the reaction, and such condensate is collected in a separation drum 17. The unconverted gases are withdrawn by the pipe 18. It is preferable to employ rates of flow and other conditions, familiar to the art, so as to obtain from 40 to 60% conversion of the gas in the reactor 16. These specific conditions vary somewhat with catalysts, but are generally known and may be readily determined.

The remaining gas is then passed through a second heater 19, a second converter 20 and into a separator 21, so as to substantially complete the conversion of the synthesis gases. The equipment just described is substantially identical with the heater, the converter and the separator previously described. The temperature and pressure conditions are likewise the same. The liquid product is drawn off and the gases comprising unconverted carbon monoxide and hydrogen together with gaseous hydrocarbons are separated from the liquid and are withdrawn from a pipe 22. These gases may be recirculated to a converter 4 or they may be returned to heaters 15 or 19. The pipes, valves and connections for these variations, are not shown on the drawing, for simplicity, but the operation will be readily understood.

The liquid product is withdrawn from the separators 17 and 21 and may be admixed and passed into a tower still 23. The materials obtained in each of the stages of the synthesis are substantially the same consisting of lower boiling fractions boiling up to about 400° F., and fractions boiling above that temperature. If desired, the light distillate boiling below about 400° F., may be taken overhead and collected in the receiving chamber 24, gas removed by 25 and the liquid recovered at 25a. The residue is then passed by a pipe 26 and pump 26a to the subsequent operations of this process. If desired, however, the separation of the light and heavy fractions need not be made, and in this case the entire liquid product may be withdrawn from the drum 17 and 21 and passed by a by-pass line 28 directly into pipe 26 thence into furnace 27, and thereafter into reaction chambers 29 and 29a.

The nature of the liquid product produced in the conversion chambers 16 and 20 will vary somewhat with the operating conditions. If the pressure is low, i. e. below about 5 atmospheres, the product is substantially hydrocarbon, and there is a relatively larger proportion of lower boiling to higher boiling fractions. It is preferred to operate the present process at higher pressure, say, 10 to 50 atmospheres, and in this condition the product contains a relatively larger proportion of fractions boiling above 400° F. It is also found that the material produced in this manner contains oxygenated compounds which while they are not satisfactory as motor fuels in their present condition are admirably adapted to the subsequent steps of the present process. The production of the higher boiling materials containing oxygen is also favored by use of temperature in the higher range given preferably from 475 to 650° F. and by the use of a catalyst containing iron rather than nickel or cobalt and under pressure of 10 to 50 atmospheres.

The product of the synthesis steps, or if desired only the heavier portion thereof, is as stated, passed into a heater 27 and thence to a plurality of reaction chambers, of which two only, 29 and 29a are shown. These chambers are packed with catalyst, which will be disclosed below, and are arranged in such a way that the heated material may be passed through one of the chambers, e. g. 29, while the catalyst in the other chamber 29a is being regenerated as will be described. The material passing through the chamber 29, e. g., is cooled in 32 and is fractionated in a tower 33, the insufficiently cracked material being returned by a pipe 34 and pump 35 to the heater 27. A distillate containing hydrocarbons of the gasoline boiling range is taken off by the vapor pipe 36, is cooled and collected in drum 37, from which the gas is separated by pipe 38. The finished distillate is obtained from the drum by the pipe 39 and the gas may be returned to the converter 4, along with the gases obtained in pipes 22 and 25. While conversion is being carried out in the chamber 29, as indicated above, regenerating gases are passed through the chamber 29a which contains spent catalyst.

The catalyst used in the conversion chambers 29 and 29a may be broadly described as of siliceous character. Effective catalysts may be obtained from Japanese active clay or acid clay, as it is sometimes called, e. g. the types of clay obtained from the Kambara or Odo districts. This clay must be dehydrated by heating to a high temperature, but 1200° F., should preferably not be exceeded, as temperatures above this limit produce a permanent deterioration of the clay. Another suitable catalyst can be made by treatment of natural clays, such as bentonites, montmorillonites and the like with mineral acid, such as hydrochloric, hydrofluoric and sulphuric. Such materials are sold under many trade names and used widely for decolorizing lubricating oils. Still other catalysts may be prepared synthetically by precipitation of silica in the gel form. The material is then dehydrated by heat. Silica may be used alone or it may be admixed or prepared by simultaneous precipitation with other gels, particularly alumina.

The above mentioned catalysts which are described broadly as active siliceous catalysts may be employed alone, but they may also be further activated by the addition of other ingredients, particularly by the addition of metal oxides, such as nickel or cobalt oxides, manganese oxides, or oxides of the fifth and sixth groups. The conversion step is carried out at a decomposing temperature, e. g. about 700 to 900° F. or perhaps 950° F., and preferably at a low pressure, say atmospheric pressure up to say five atmospheres. The rate of flow may vary considerably depending upon the particular catalyst and temperature and other conditions. The length of run also depends on the nature of the oil and the conditions of operation, but it is ordinarily from 2 to 4 hours more or less before regeneration is required, this is made manifest by the gradually decreasing conversion. It has been found desirable not to let the activity fall too low before regeneration, because this requires an excessively long period for regeneration. It is preferred to use air diluted with steam or other inert gas for the regeneration, this is accomplished by passing the gas through the catalyst at a temperature up to about 1000° or 1200° F., at which temperature the carbon may be burned off without spoiling the catalyst. By the time the catalyst in the converter chamber 28 has deteriorated, the material to be converted may be passed through the chamber 29 now ready for use, and the regenerating gases may be passed through chamber 28. In this way, one of the chambers will be continually in use, while the other is being regenerated.

The present process is particularly advantageous because of the high yield and excellent quality of the products. Gasoline obtained directly by the reaction of a mixture of carbon monoxide and hydrogen, is poor in quality particularly from the anti-detonation standpoint, and the present process presents a great advantage in this respect, in that a relatively small amount of gasoline may be produced in the initial synthesis step along with a major quantity of higher boiling material. This latter material is converted into gasoline in the subsequent step and is found to be of superior quality in respect to stability and anti-detonation quality. While it is not necessary to this invention to produce an intermediate product containing oxygen, it is preferred to operate under such conditions because a material of this type has a marked advantage in the subsequent steps of the process in which the higher boiling material is converted to gasoline and is simultaneously deoxygenated. It is observed that simultaneous conversion and deoxygenation favorably influences the anti-detonation characteristics in the product.

To illustrate the nature of the present process and the advantages of the present known process, the following may be considered.

Example 1

A mixture of carbon monoxide and hydrogen, consisting of one part of the former to two of the latter was converted in the usual manner with a pressure of two to three atmospheres and at a temperature of 350° F. using a nickel catalyst. The product obtained comprised about 50 to 60% of gasoline and 40 to 50% of heavier liquid, depending on the fractionation and type of gasoline cut. The gasoline was exceptionally light and had the following characteristics:

| | |
|---|---|
| Gravity °A. P. I. | 71.6 |
| Percent at 158° F. percent | 28.0 |
| Percent at 212° F. do | 53.0 |
| Percent at 257° F. do | 71.0 |
| Final boiling point °F. | 376 |

The octane number of the product was found to be 57 clear and an analysis showed that it had a bromine number of 71. The material was essentially a mixture of paraffin and olefine hydrocarbons.

The gas-oil fraction of the product had a gravity of 51.3° A. P. I., an aniline point of 119, an initial boiling point of 308° F., 50% boiled over at 510° F. and it had a final boiling point of 740° F. This gas-oil was converted at a temperature of 870° F. using a flow of .55 volume of oil per volume of catalyst per hour. The catalyst was an acid treated clay of the montmorillonite type. The yield of gasoline obtained in this way amounted to 41.4% and 49% of gas-oil remained, which could be converted in the subsequent operation. The gasoline had the following characteristics:

| | |
|---|---|
| Gravity °A. P. I. | 56.3 |
| Spec. gravity | 0.7535 |
| Percent at 158° F. percent | 20 |
| Percent at 212° F. do | 39 |
| Percent at 257° F. do | 50 |
| Final boiling point °F. | 411 |

It will be noted that this material had a better boiling curve than gasoline directly produced in the previous step, it also had an octane number of 74.2 clear.

Example 2

In the second experiment the conditions of operation were changed as follows:

The pressure was increased to about 20 atmospheres, the temperature raised to 600° to 625° F., an an iron catalyst was substituted for the nickel catalyst previously used. The yield of oil obtained in the conversion step was substantially the same as that obtained in the previous example, but it was observed that the proportion of gasoline obtained was decreased to about 40%, and the proportion of gas-oil was correspondingly increased to about 60%. Inspection also showed that the gas-oil contained a mixture of oxygen compounds of unknown constitution to the extent of about 2.5% and was not stable as such.

The gas-oil fraction was then cracked under identical conditions of the prior example with substantially the same yields. The distillate product or gasoline was completely free from oxygen compounds and had an improved octane number.

The present invention is not to be limited to any theory of the operation nor to the chemical reactions believed to have taken place, nor to any specific conditions or catalysts, but only to the following claims to which it is desired to claim all novelty adherent to the invention.

I claim:

1. An improved process for manufacturing motor fuel comprising the step of directly reacting carbon monoxide and hydrogen at a temperature between 475 and 650° F. while under pressure of about 10 to 50 atmospheres, with a catalyst comprising iron, whereby an oxygen containing liquid is produced, then treating a portion of the product so obtained at a temperature between about 700 to 950° F., in the presence of an active siliceous catalyst, whereby the material is deoxygenated and converted into an improved motor fuel.

2. Process according to claim 1, in which the intermediate liquid material first produced is separated into lower boiling products, and products boiling above the motor fuel range, and in which the latter fraction alone is subjected to the second reaction step.

3. Process according to claim 1 in which the second step is carried out at a pressure between atmospheric pressure and five atmospheres.

4. An improved process for manufacturing motor fuel comprising the steps of producing liquid organic material by direct reaction of carbon monoxide and hydrogen at temperatures from about 475° to 650° F. while under a pressure between about 10–50 atmospheres with a catalyst comprising iron, whereby substantial amounts of hydrocarbon boiling above 400° F. are produced, then treating the liquid at a decomposing temperature in the presence of an active siliceous catalyst.

5. An improved process for manufacturing motor fuel comprising the steps of producing liquid organic material by direct reaction of carbon monoxide and hydrogen at a temperature of approximately 600-625° F. while under a pressure of approximately 20 atmospheres with a catalyst comprising iron, then treating the liquid at a decomposing temperature in the presence of an active siliceous catalyst.

WILLARD C. ASBURY.